(12) United States Patent
Hasegawa et al.

(10) Patent No.: US 6,592,784 B2
(45) Date of Patent: Jul. 15, 2003

(54) NEAR INFRARED ABSORPTION COMPOSITION AND NEAR INFRARED ABSORPTION FILTER PRODUCED FROM SAID COMPOSITION

(75) Inventors: Shun Hasegawa, Chiba (JP); Gen Masuda, Chiba (JP)

(73) Assignee: Nisshinbo Industries, Inc., Tokyo (JP)

(*) Notice: Subject to any disclaimer, the term of this patent is extended or adjusted under 35 U.S.C. 154(b) by 85 days.

(21) Appl. No.: 09/769,338

(22) Filed: Jan. 26, 2001

(65) Prior Publication Data

US 2001/0011719 A1 Aug. 9, 2001

(30) Foreign Application Priority Data

Feb. 4, 2000 (JP) ........................................ 2000-027032

(51) Int. Cl.⁷ ............................. F21V 9/04; C08F 130/04
(52) U.S. Cl. ..................... 252/587; 359/885; 526/241; 556/111
(58) Field of Search .......................... 252/587; 359/885; 526/241; 556/111

(56) References Cited

U.S. PATENT DOCUMENTS 3,847,846 A * 11/1974 Asada .......................... 556/111
4,530,987 A * 7/1985 Lundberg et al. ............ 526/241
5,611,965 A * 3/1997 Shouji et al. ................. 252/587

* cited by examiner

Primary Examiner—Philip Tucker
(74) Attorney, Agent, or Firm—Kubovcik & Kubovcik

(57) ABSTRACT

A near infrared absorption acrylic composition containing a sulfonic acid group-containing (meth)acrylic compound represented by the following general formula (1):

$$R(CH_2)_n SO_3 H \quad (1)$$

(wherein R is $CH_2=CHCOO-$ or $CH_2=C(CH_3)COO-$, and n is an integer of 1 to 8), other (meth)acrylic compound and $Cu^{2+}$; and a near infrared absorption filter produced from the composition.

12 Claims, 6 Drawing Sheets

NEAR INFRARED ABSORPTION COMPOSITION AND NEAR INFRARED ABSORPTION FILTER PRODUCED FROM SAID COMPOSITION

BACKGROUND OF THE INVENTION

1. Field of the Invention

The present invention relates to a near infrared absorption composition and a near infrared absorption filter produced from the composition. More particularly, the present invention relates to a novel near infrared absorption composition which shows an absorption for a near infrared region and a high transmittance for a visible light region and wherein attention has been paid to environmental problems; as well as to a near infrared absorption filter produced from the composition.

2. Description of the Prior Art

In recent years, development of plasma display panel has been active and its products have been put into market. As is easily anticipated from their principle, plasma display panels emit a near infrared light during the plasma discharge; since this near infrared light is close to the near infrared light used by the remote controllers of electronic appliances such as household TVs, air conditioners, video tape recorders and the like, plasma displays invite malfunctioning of the electronic appliances placed in the vicinity thereof. Hence, a near infrared absorption filter is often used as a surface plate of plasma display, for absorption and shielding of a near infrared region of 800 to 1,000 nm, particularly 850 to 1,000 nm.

The above near infrared absorption filter has been produced in various forms and there are being actually used, for example, a filter comprising a glass as a filter substrate and a metal (e.g. silver) vapor-deposited on the glass for reflection of near infrared light, and a filter which is an appropriate transparent polymer containing a near infrared-absorbing dye. However, the former filter requires large production equipment, resulting in a high cost; and the latter filter has absorptivity also for a visible light region, resulting in lower transmittance for visible light.

A filter which is an appropriate transparent polymer containing a copper salt of carboxylic acid, is also provided. In general, copper salts of carboxylic acid such as copper acetate, copper stearate and the like have low solubility in solvents by themselves. Therefore, it is difficult to allow a copper salt of carboxylic acid to be present in a transparent polymer at a high concentration; further, a copper salt of carboxylic acid shows the maximum absorption at around 700 nm and accordingly is unable to show sufficient absorptivity for near infrared light. Therefore, it is necessary to add phosphoric acid, thiourea or the like to the copper salt of carboxylic acid to shift the absorption spectrum to a near infrared side and also is necessary to improve the copper salt of carboxylic acid's solubility in solvent.

Organic phosphoric acids are designated as a hazardous industrial waste and their adverse effects on environment need to be taken into account. Meanwhile, a near infrared absorption filter which is a transparent polymer containing thiourea, has low absorptivity for near infrared light.

OBJECT AND SUMMARY OF THE INVENTION

The present invention aims at alleviating the above-mentioned drawbacks of the prior art and providing mainly (1) a novel near infrared absorption composition which has an absorptivity for a near infrared region and a high transmittance for a visible light region and wherein attention has been paid to environmental problems and (2) a near infrared absorption filter produced from the composition.

The present invention provides the following inventions.

[1] A near infrared absorption acrylic composition containing a sulfonic acid group-containing (meth)acrylic compound represented by the following general formula (1):

(wherein R is $CH_2=CHCOO—$ or $CH_2=C(CH_3)COO—$, and n is an integer of 1 to 8), other (meth)acrylic compound and $Cu^{2+}$.

[2] A near infrared absorption acrylic composition containing a salt of sulfonic acid group-containing (meth)acrylic compound, represented by the following general formula (2):

(wherein R is $CH_2=CHCOO—$ or $CH_2=C(CH_3)COO—$, and n is an integer of 1 to 8) and other (meth)acrylic compound.

[3] A near infrared absorption resin composition which is a polymer solution containing a salt of sulfonic acid group-containing (meth)acrylic compound, represented by the following general formula (2):

(wherein R is $CH_2=CHCOO—$ or $CH_2=C(CH_3)COO—$, and n is an integer of 1 to 8).

[4] A near infrared absorption salt of sulfonic acid group-containing (meth)acrylic compound, represented by the following general formula (2):

(wherein R is $CH_2=CHCOO—$ or $CH_2=C(CH_3)COO—$, and n is an integer of 1 to 8).

[5] A near infrared absorption filter containing the near infrared salt of sulfonic acid group-containing (meth)acrylic compound, set forth in the above [4].

[6] A near infrared absorption acrylic resin plate produced, by thermal polymerization, from the near infrared absorption acrylic composition set forth in the above [1] or [2], and a near infrared absorption filter comprising the near infrared absorption acrylic resin plate.

[7] A near infrared absorption acrylic resin film produced, by UV polymerization, from the near infrared absorption acrylic composition set forth in the above [1] or [2], and a near infrared absorption filter comprising the near infrared absorption acrylic resin film.

[8] A near infrared absorption resin film produced, by casting, from the near infrared absorption resin composition set forth in the above [3], and a near infrared absorption filter comprising the near infrared absorption resin film.

Incidentally, the $Cu^{2+}$ in the above near infrared absorption acrylic composition [1] is added in the form of, for example, a carboxylic acid salt.

DETAILED DESCRIPTION OF THE INVENTION

Figure 1:
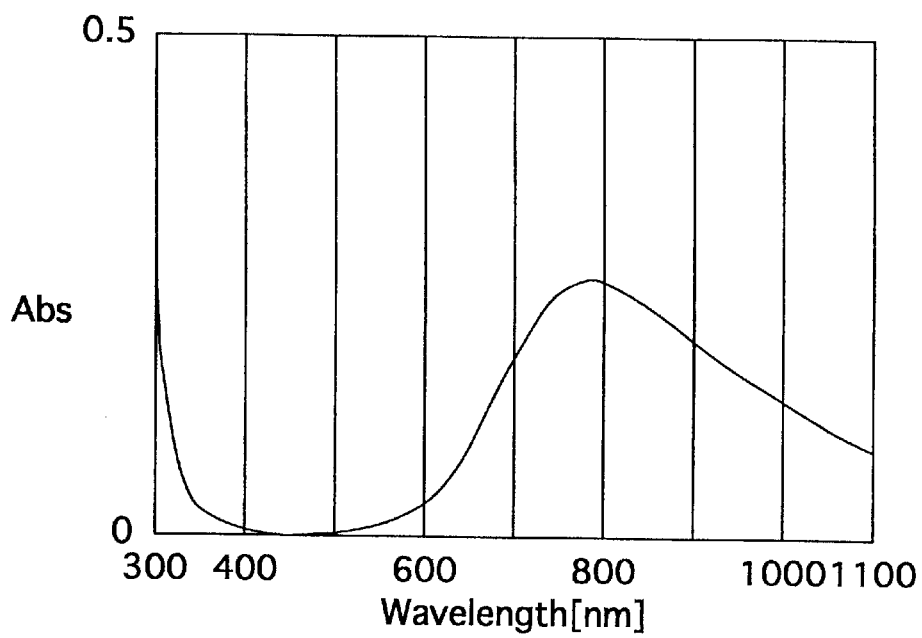
FIG. 1 is an absorption spectrum of the copper salt of 3-sulfopropyl methacrylate, obtained in Example 1.

The present invention is described in detail below.

The near infrared absorption acrylic composition [1] of the present invention contains, as described previously, a sulfonic acid group-containing (meth)acrylic compound represented by the following general formula (1):

$$R(CH_2)_nSO_3H \quad (1)$$

other (meth)acrylic compound and $Cu^{2+}$. In the sulfonic acid group-containing (meth)acrylic compound represented by the general formula (1), R is $CH_2=CHCOO-$ or $CH_2=C(CH_3)COO-$, and n is an integer of 1 to 8, respectively.

The sulfonic acid group-containing (meth)acrylic compound represented by the above general formula (1) can be produced by reacting (meth)acrylic acid with, for example, a sulfonic acid metal salt-containing alcohol represented by $HO(CH_2)_nSO_3^-M^+$, to obtain a sulfonic acid metal salt-containing (meth)acrylic compound, and then converting the sulfonic acid metal salt into a sulfonic acid by using an ion exchange resin or the like.

As the sulfonic acid group-containing (meth)acrylic compound represented by the above general formula (1), 2-sulfoethyl (meth)acrylate and 3-sulfopropyl (meth)acrylate are commercially available; therefore, use of such a commercial compound is preferred from the standpoint of availability.

The other (meth)acrylic compound also contained in the near infrared absorption acrylic composition [1] of the present invention can be an acrylic compound ordinarily used in synthesis of acrylic resin, such as methyl acrylate, methyl methacrylate or the like.

The $Cu^{2+}$ also contained in the near infrared absorption acrylic composition [1] of the present invention can be added to the acrylic composition in the form of, for example, an appropriate copper salt. The copper salt is preferably a copper salt of a carboxylic acid, such as copper acetate, copper benzoate, copper stearate or the like.

In the near infrared absorption acrylic composition [1] of the present invention, ion exchange takes place between the sulfonic acid group-containing (meth)acrylic compound represented by the general formula (1) and the copper salt, whereby is formed a salt of sulfonic acid group-containing (meth)acrylic compound, of the present invention, represented by the following general formula (2):

$$[R(CH_2)_nSO_3^-]_2Cu^{2+} \quad (2)$$

(wherein R and n each have the same definition as given above). The salt represented by the formula (2) has absorptivity for a near infrared light. Therefore, in the near infrared absorption acrylic composition [1] of the present invention, the sulfonic acid group-containing (meth)acrylic compound represented by the formula (1) and the copper salt are mixed with the other (meth)acrylic compound so that the sulfonic acid group-containing (meth)acrylic compound of the formula (1) is present in the composition in an amount at least equivalent to the copper salt. When the amount of the sulfonic acid group-containing (meth)acrylic compound of the formula (1) in the composition is less than equivalent to the copper salt, the copper salt is present in the composition in an excess, which is not preferred from the standpoint of absorptivity for near infrared light.

The near infrared absorption acrylic composition [1] of the present invention may further contain a near infrared absorption substance, an ultraviolet absorption substance, a crosslinking agent, an oxidation inhibitor, a polymerization retarder, a dye, a pigment and a color-controlling agent as long as they do not impair the near infrared absorptivity of the composition [1].

By subjecting the near infrared absorption acrylic composition [1] of the present invention, constituted as above, to thermal polymerization, a near infrared absorption acrylic resin plate of the present invention can be obtained. The polymerization conditions employed in that case can be determined, as in the thermal polymerization of ordinary acrylic composition, by appropriately selecting a catalyst, and by employing reaction temperature and reaction time with consideration of a kind of the catalyst.

Also, by subjecting the near infrared absorption acrylic composition [1] of the present invention to UV polymerization, a near infrared absorption acrylic resin film can be obtained. The polymerization conditions employed in that case can be determined, as in the UV polymerization of ordinary acrylic composition, by appropriate selection of polymerization initiator, the wavelength and intensity of UV used, reaction temperature and reaction time.

The concentration of the salt of sulfonic acid group-containing (meth) acrylic compound, represented by the formula (2), i.e. the concentration of $Cu^{2+}$ differs depending upon the thickness of the near infrared absorption acrylic resin plate or film obtained as above. When the thickness is small, the concentration of $Cu^{2+}$ needs be high and, when the thickness is large, the concentration needs be low. In the case of, for example, a near infrared absorption acrylic resin plate having a thickness of 3 mm, the concentration of $Cu^{2+}$ in the near infrared absorption acrylic composition [1] is 0.01 to 0.5 mM/l, preferably 0.05 to 0.25 mM/l.

By using the near infrared absorption acrylic resin plate of the present invention obtained as above, per se, or by laminating the near infrared absorption acrylic film of the present invention obtained as above, with other base material as necessary and then making appropriate fabrication, there can be obtained a near infrared absorption filter of the present invention containing the salt of sulfonic acid group-containing (meth)acrylic compound, represented by the formula (2).

As described previously, in the near infrared absorption acrylic composition [1] of the present invention, ion exchange takes place between the sulfonic acid group-containing (meth)acrylic compound represented by the formula (1) and the copper salt such as copper acetate or the like, whereby is formed a salt of sulfonic acid group-containing (meth)acrylic compound, represented by the formula (2) according to the present invention. As a result, a by-product, i.e. acetic acid (when copper acetate is used) comes to be present in the near infrared absorption acrylic composition [1].

Hence, it is possible to beforehand produce a salt of sulfonic acid group-containing (meth)acrylic compound, of the formula (2) of the present invention, from a sulfonic acid group-containing (meth)acrylic compound represented by the formula (1) and a copper salt, isolate the salt of the formula (2), add the isolated salt to other (meth)acrylic compound to obtain a composition [2] of higher purity.

In the thus-obtained near infrared absorption acrylic composition [2] of the present invention, the adverse effects caused by the presence of the above-mentioned by-product (e.g. acetic acid) can be completely eliminated.

Beforehand production and isolation of a salt of sulfonic acid group-containing (meth)acrylic compound, of the formula (2) of the present invention, can be conducted, for example, by dissolving a sulfonic acid group-containing (meth)acrylic compound which sulfonic acid group is made free by ion exchange or the like, and a copper salt (e.g. copper acetate) in deionized water completely and then subjecting the resulting solution to freeze-drying or reprecipitation. It is also possible to beforehand isolate a sulfonic acid group-containing (meth)acrylic compound which sulfonic acid group is made free.

The near infrared absorption acrylic composition [2] of the present invention obtained as above by beforehand producing and isolating a salt of sulfonic acid group-containing (meth)acrylic compound, of the formula (2) of the present invention and adding the salt to other (meth) acrylic compound, can be used similarly to the near infrared absorption acrylic composition [1] of the present invention.

Further, by beforehand producing and isolating a salt of sulfonic acid group-containing (meth)acrylic compound, of the formula (2) of the present invention and adding the salt to an appropriate polymer solution, a near infrared absorption resin composition [3] of the present invention can be obtained. In this case, the polymer solution can be, for example, a polyvinyl alcohol solution, a polyvinyl butyral solution or an acrylic resin solution.

The obtained near infrared absorption resin composition [3] of the present invention, similarly to the near infrared absorption acrylic compositions [1] and [2], can be used for production of a near infrared absorption resin film. For that purpose, the composition [3] can be cast, for example. Besides, the composition [3] can be coated on a base material or can be used as an adhesive layer.

The present invention is described in more detail below by way of Examples.

EXAMPLE 1

10.7 g of potassium salt of 3-sulfopropyl methacrylate (a product of Tokyo Kasei Kogyo Co., Ltd.) was dissolved in 100 ml of deionized water. Thereto was added 25 g of an ion exchange resin, Amberlite 252 Na (trademark) converted to H type (a product of Organo Corporation). The mixture was stirred for 15 minutes, after which the ion exchange resin was removed by filtration. To the filtrate was added 4.34 g of copper acetate monohydrate (a product of Wako Pure Chemical Industries, Ltd.) to obtain a complete solution. The solution was frozen and subjected to freeze-drying to obtain 5.2 g of copper salt of 3-sulfopropyl methacrylate. The compound obtained was measured for absorption spectrum (10 mg/ml aqueous solution), and the spectrum is shown in FIG. 1.

To 1 part by weight of the above-synthesized copper salt of 3-sulfopropyl methacrylate were added 4.7 parts by weight of methyl methacrylate (a product of Tokyo Kasei Kogyo Co., Ltd.), 10 parts by weight of NK Ester 9G (a crosslinking agent, a product of Shin-Nakamura Chemical Co., Ltd.), 5.4 parts by weight of 2-hydroxyethyl acrylate (a solubility improver, a product of Tokyo Kasei Kogyo Co., Ltd.) and 0.125 part by weight of 2,2'-azobis(2,4-dimethylveleronitrile) (a product of Wako Pure Chemical Industries, Ltd.), followed by thorough stirring, to obtain a uniform solution.

Figure 2:
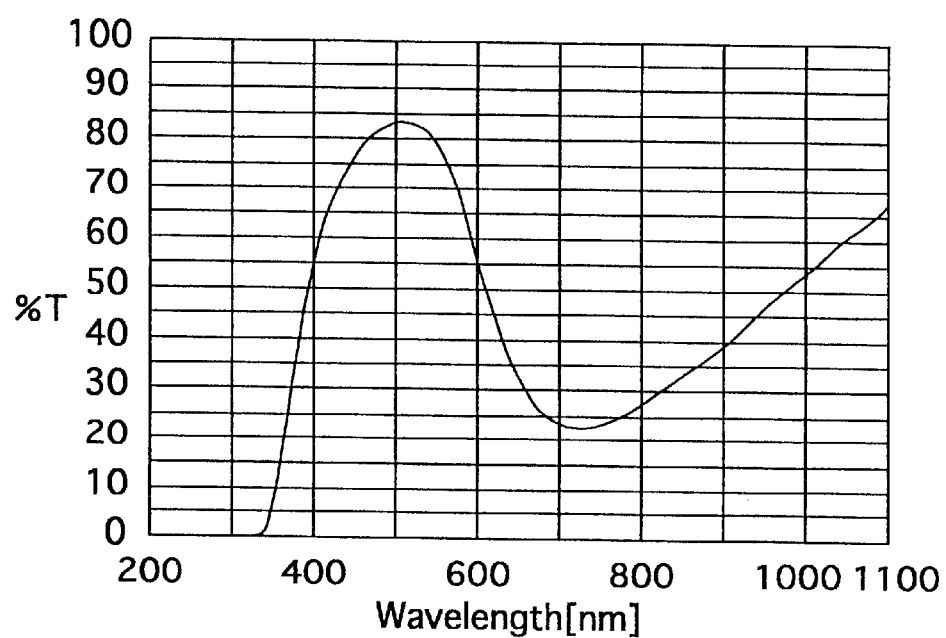
FIG. 2 is a chart showing the transmittance of the acrylic plate obtained in Example 1.

A polyvinyl chloride tube was interposed between two tempered glass sheets, whereby a space having an open end at the top was formed between the tempered glass sheets. The tempered glass sheets were fixed by a large clip to prepare a simple container. Into the container was poured the above-obtained solution; then, a reaction was allowed to take place at 60° C. for 3 hours, at 90° C. for 1 hour and at 110° C. for 30 minutes to produce an acrylic plate. The acrylic plate was measured for transmittance for 200 to 1,100 nm, to obtain a chart shown in FIG. 2. As is clear from the chart of FIG. 2, the acrylic plate has a high transmittance for a visible light and an absorptivity for a near infrared light.

COMPARATIVE EXAMPLE 1

To 1 part by weight of copper acetate monohydrate were added 4.7 parts by weight of methyl methacrylate (a product of Tokyo Kasei Kogyo Co., Ltd.), 10 parts by weight of NK Ester 9G (a product of Shin-Nakamura Chemical Co., Ltd.), 5.4 parts by weight of 2-hydroxyethyl acrylate (a product of Tokyo Kasei Kogyo Co., Ltd.) and 0.125 part by weight of 2,2'-azobis(2,4-dimethylveleronitrile) (a product of Wako Pure Chemical Industries, Ltd.). The mixture was thoroughly stirred for 1 hour. Then, undissolved copper acetate monohydrate was removed by vacuum filtration, whereby a solution was obtained.

A polyvinyl chloride tube was interposed between two tempered glass sheets, whereby a space having an open end at the top was formed between the tempered glass sheets. The tempered glass sheets were fixed by a large clip to prepare a simple container. Into the container was poured the above-obtained solution; then, a reaction was allowed to take place at 60° C. for 3 hours, at 90° C. for 1 hour and at 110° C. for 30 minutes to produce an acrylic plate. The acrylic plate was measured for transmittance for 200 to 1,100 nm, to obtain a chart shown in FIG. 3.

Figure 3:
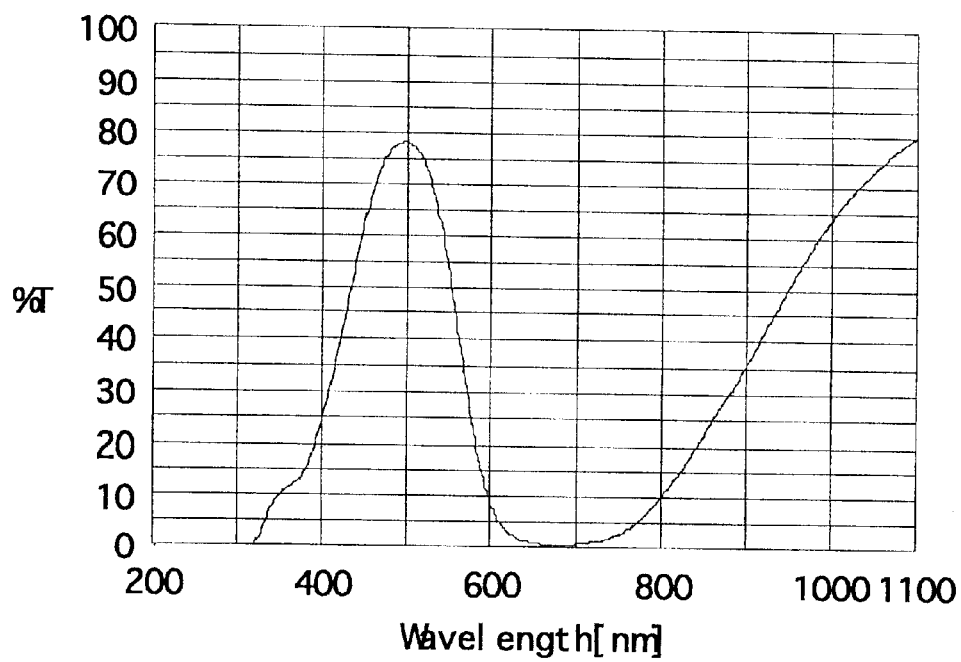
FIG. 3 is a chart showing the transmittance of the acrylic plate obtained in Comparative Example 1.

As is clear from the chart of FIG. 3, since a molecular weight of copper acetate monohydrate is smaller than that of copper salt of 3-sulfopropyl methacrylate, and accordingly, same weight of copper acetate monohydrate contains large mole number as conpared with copper salt of 3-sulfopropyl methacrylate, the acrylic plate shows high absorption but the maximum absorption wavelength is 700 nm or smaller (that is, the absorption for visible light region is high and the transmittance for visible light region is low); moreover, the absorption for near infrared region is not high.

EXAMPLE 2

Figure 4:
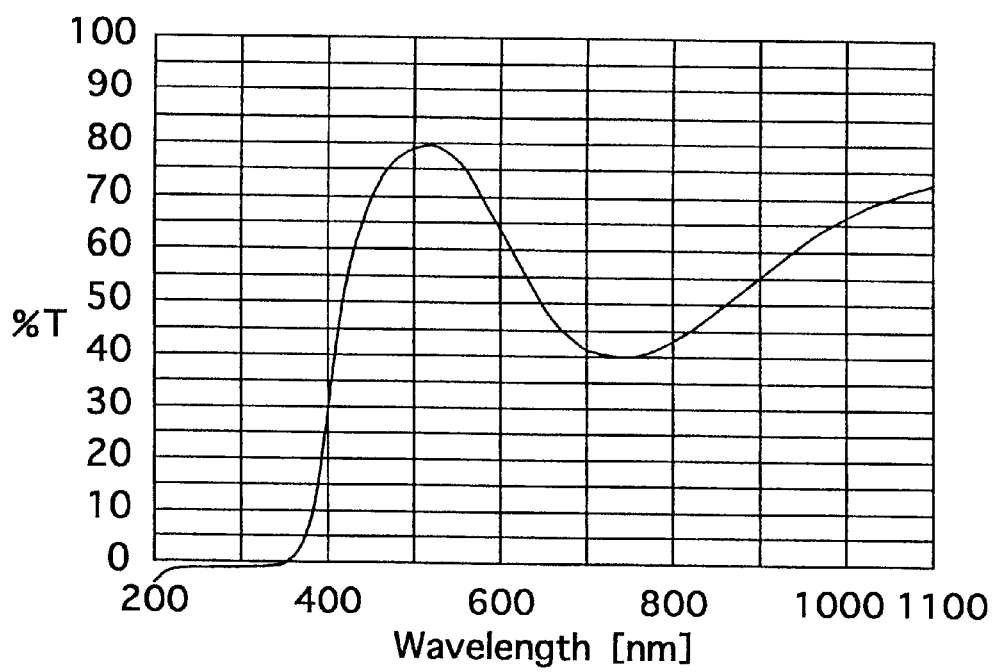
FIG. 4 is a chart showing the transmittance of the acrylic film obtained in Example 2.

1.5 ml of an aqueous solution containing 0.67 g/ml of copper salt of 3-sulfopropyl methacrylate, obtained in the same manner as in Example 1 was added to 2.0 g of a polyvinyl alcohol, PVA 217 (a 15 wt. % aqueous solution, a product of Kuraray Co., Ltd.). The mixture was stirred thoroughly to obtain a uniform solution. The solution was allowed to stand until no air bubbles were present. Then, the solution was cast on a PET film, A 4300 (a product of Toyobo Co., Ltd.) using a bar coater having a gap of 300 μm (Doctor Blade YD 7, a product of Yoshimitsu Seiki K.K.), to form a film. The film was allowed to stand at room temperature for 30 minutes and then dried at 90° C. for 10 minutes. The film was measured for transmittance for 200 to 1,100 nm, to obtain a chart shown in FIG. 4. As is clear from the chart of FIG. 4, the film has a high transmittance for a visible light and an absorptivity for a near infrared light.

COMPARATIVE EXAMPLE 2

1.5 ml of a saturated aqueous copper acetate monohydrate (about 0.2 g/ml) solution was added to 2.0 g of a polyvinyl alcohol, PVA 217 (a 15 wt. % aqueous solution, a product of Kuraray Co., Ltd.). The mixture was stirred thoroughly to obtain a uniform solution. The solution was allowed to stand until no air bubbles were present. Then, the solution was cast on a PET film, A 4300 (a product of Toyobo Co., Ltd.) using a bar coater having a gap of 300 μm (Doctor Blade YD 7, a product of Yoshimitsu Seiki K.K.), to form a film. The film was allowed to stand at room temperature for 30 minutes and then dried at 90° C. for 10 minutes. The film was measured for transmittance for 200 to 1,100 nm, to obtain a chart shown in FIG. 5.

Figure 5:
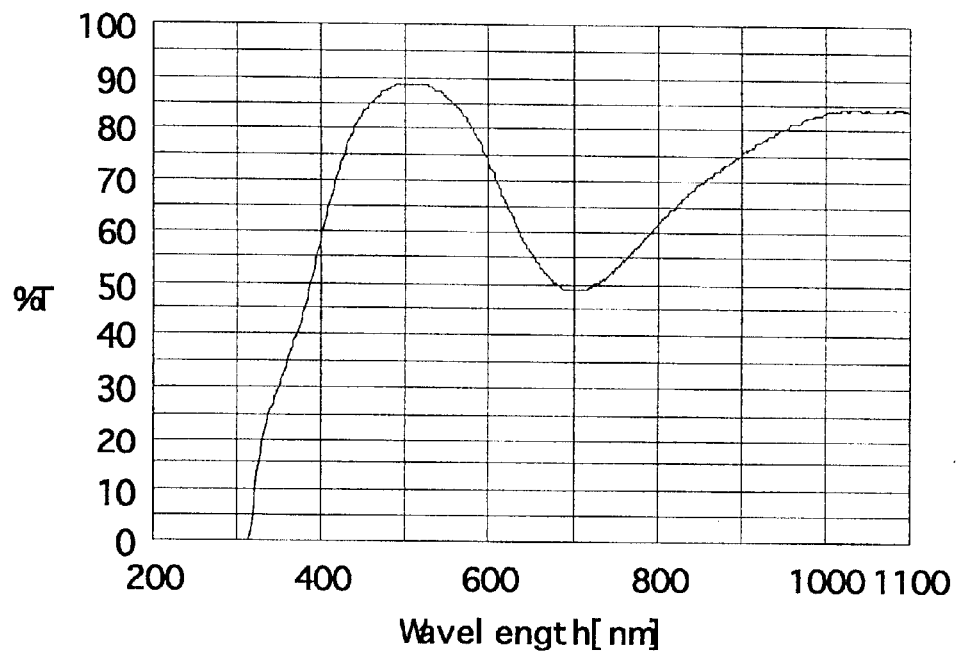
FIG. 5 is a chart showing the transmittance of the acrylic film obtained in Comparative Example 2.

As is clear from the chart of FIG. 5, the solubility of copper acetate monohydrate in water is low, the maximum absorption wavelength is around 700 nm, and the chart has a sharp form; therefore, the absorptivity for near infrared region is fairly low.

EXAMPLE 3

Figure 6:
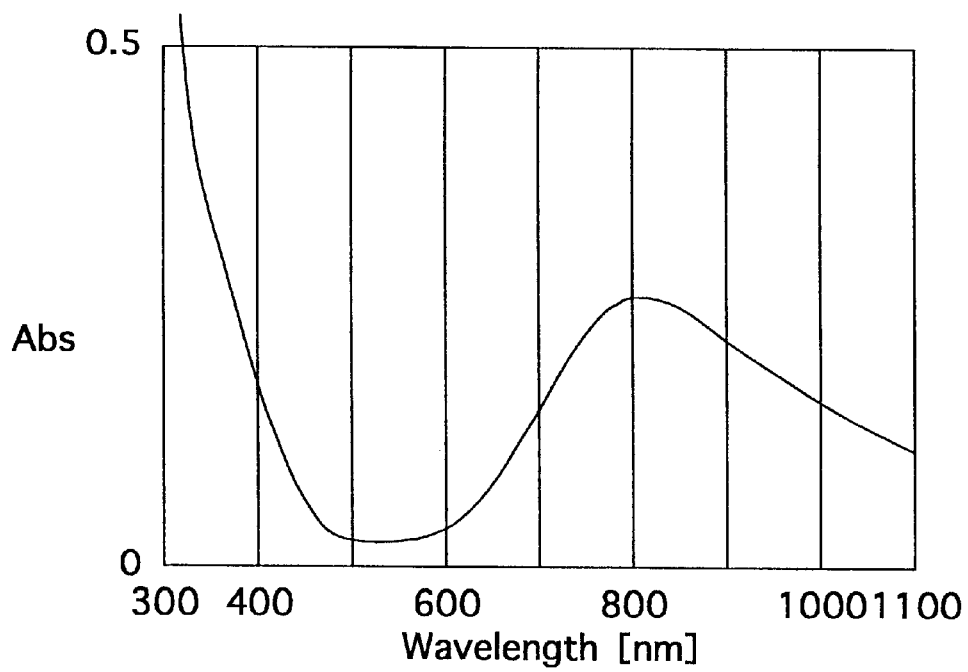
FIG. 6 is an absorption spectrum of the copper salt of 3-sulfopropyl methacrylate, obtained in Example 3.

10.6 g of 2-sulfoethyl methacrylate (a product of Poly Science Co.) was dissolved in 40 ml of methanol. To the mixture being stirred was added 5.45 g of copper acetate monohydrate (a product of Wako Pure Chemical Industries, Ltd.). The mixture was stirred until it became a complete solution. The solution was subjected to vacuum distillation to remove the solvent. To the residue were added isopropanol and a small amount of ethanol, to obtain a complete solution. The solution was poured into a large amount of hexane. The resulting crystals were collected by filtration and then dried to obtain 11.68 g of copper salt of 2-sulfoethyl methacrylate. The copper salt was measured for absorption spectrum (10 mg/ml aqueous solution), and the absorption spectrum is sown in FIG. 6.

Figure 7:
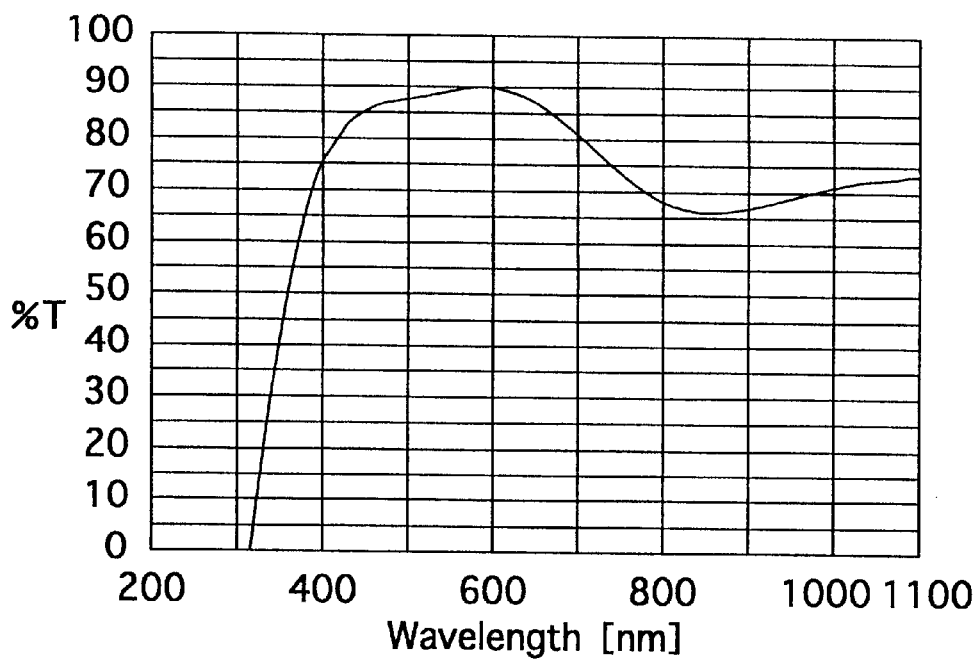
FIG. 7 is a chart showing the transmittance of the acrylic film obtained in Example 3.

2 ml of an ethanol solution containing 0.25 g/ml of the copper salt of 2-sulfoethyl methacrylate obtained above was added to 3.0 g of a polyvinyl butyral, BY 613 (a 15 wt. % ethanol solution, a product of Denki Kagaku Kogyo K.K.). The mixture was stirred thoroughly to obtain a uniform solution. The solution was allowed to stand until no air bubbles were present. Then, the solution was cast on a PET film, A 4300 (a product of Toyobo Co., Ltd.) using a bar coater having a gap of 300 μm (Doctor Blade YD 7, a product of Yoshimitsu Seiki K.K.), to form a film. The film was allowed to stand at room temperature for 30 minutes and then dried at 90° C. for 10 minutes. The film was measured for transmittance for 200 to 1,100 nm, to obtain a chart shown in FIG. 7. As is clear from the chart of FIG. 7, the film has a high transmittance for a visible light and an absorptivity for a near infrared light.

COMPARATIVE EXAMPLE 3

2 ml of a saturated ethanol solution containing about 0.032 g/ml of copper acetate monohydrate was added to 3.0 g of a polyvinyl butyral, BY 613 (a 15 wt. % ethanol solution, a product of Denki Kagaku Kogyo K.K.). The mixture was stirred thoroughly to obtain a uniform solution. The solution was allowed to stand until no air bubbles were present. Then, the solution was cast on a PET film, A 4300 (a product of Toyobo Co., Ltd.) using a bar coater having a gap of 300 μm (Doctor Blade YD 7, a product of Yoshimitsu Seiki K.K.), to form a film. The film was allowed to stand at room temperature for 30 minutes and then dried at 90° C. for 10 minutes. The film was measured for transmittance for 200 to 1,100 nm, to obtain a chart shown in FIG. 8.

Figure 8:
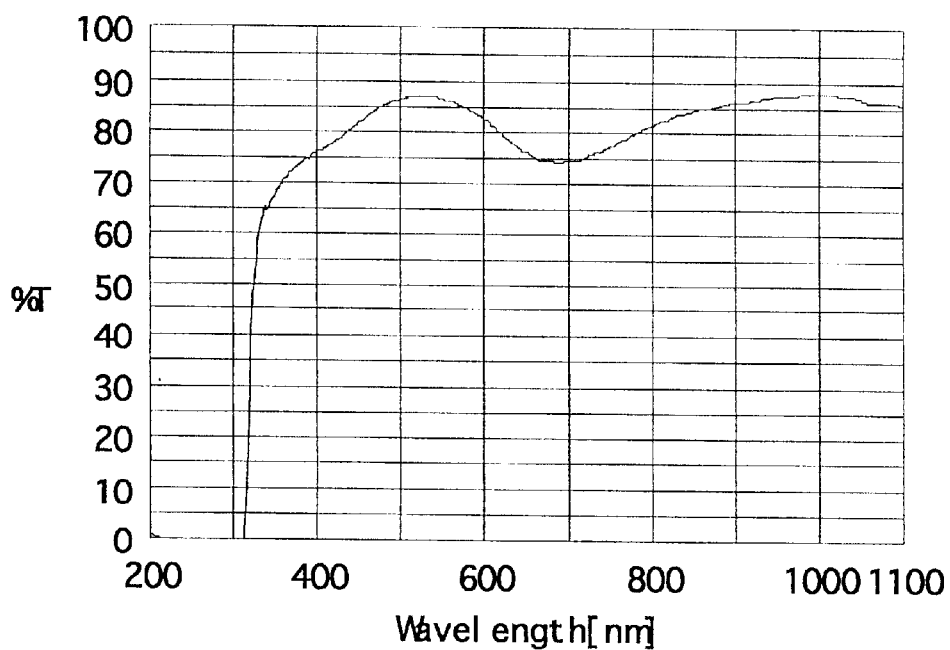
FIG. 8 is a chart showing the transmittance of the acrylic film obtained in Comparative Example 3.

As is clear from the chart of FIG. 8, the solubility of copper acetate monohydrate in ethanol is low and the maximum absorption wavelength is around 700 nm; therefore, there is substantially no absorptivity for a near infrared region.

EXAMPLE 4

Figure 9:
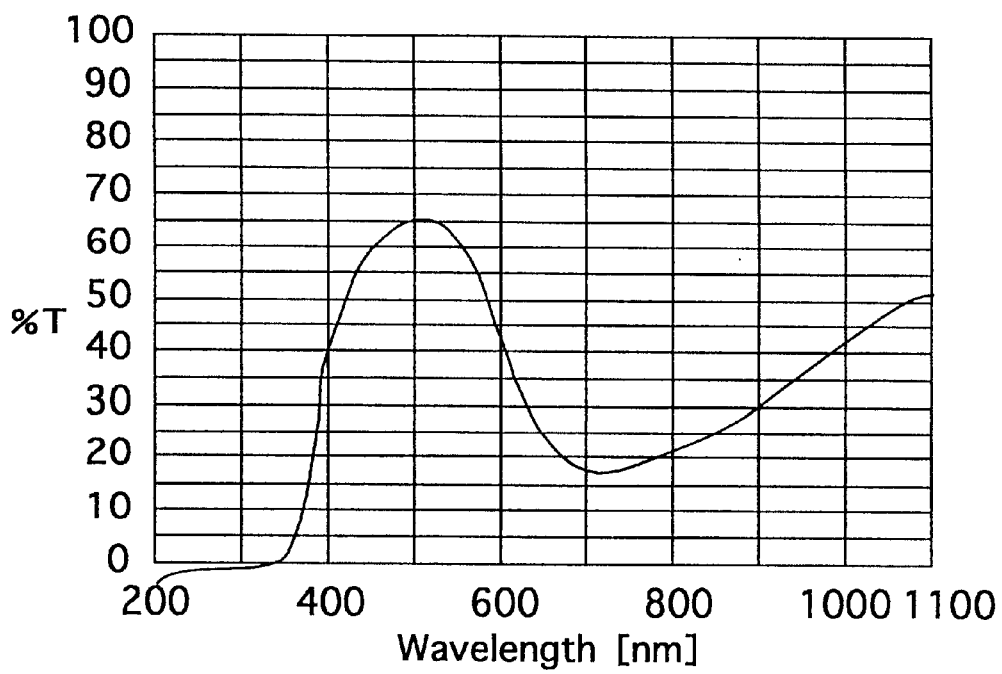
FIG. 9 is a chart showing the transmittance of the acrylic film obtained in Example 4.

To 100 parts by weight of a 2-hydroxyethyl acrylate (a product of Tokyo Kasei Kogyo Co., Ltd.) solution containing 0.1 mg/ml of the copper salt of 3-sulfopropyl methacrylate obtained in Example 1 were added 50 parts by weight of a polyester acrylate, M 6200 (a crosslinking agent, a product of Toagosei Co., Ltd.) and 1.5 parts by weight of a 2-hydroxyethyl acrylate (a product of Tokyo Kasei Kogyo Co., Ltd.) solution containing 0.1 mg/ml of Irgacure 184 (a polymerization initiator, a product of Ciba Specialty Chemicals K.K.). The resulting solution was coated on a PET film, followed by UV application for 3 minutes, to obtain a blue near infrared absorption film. The film was measured for transmittance for 200 to 1,100 nm to obtain a chart shown in FIG. 9. As is clear from the chart of FIG. 9, the film has a high transmittance for a visible light and an absorptivity for a near infrared light.

EXAMPLE 5

Figure 10:
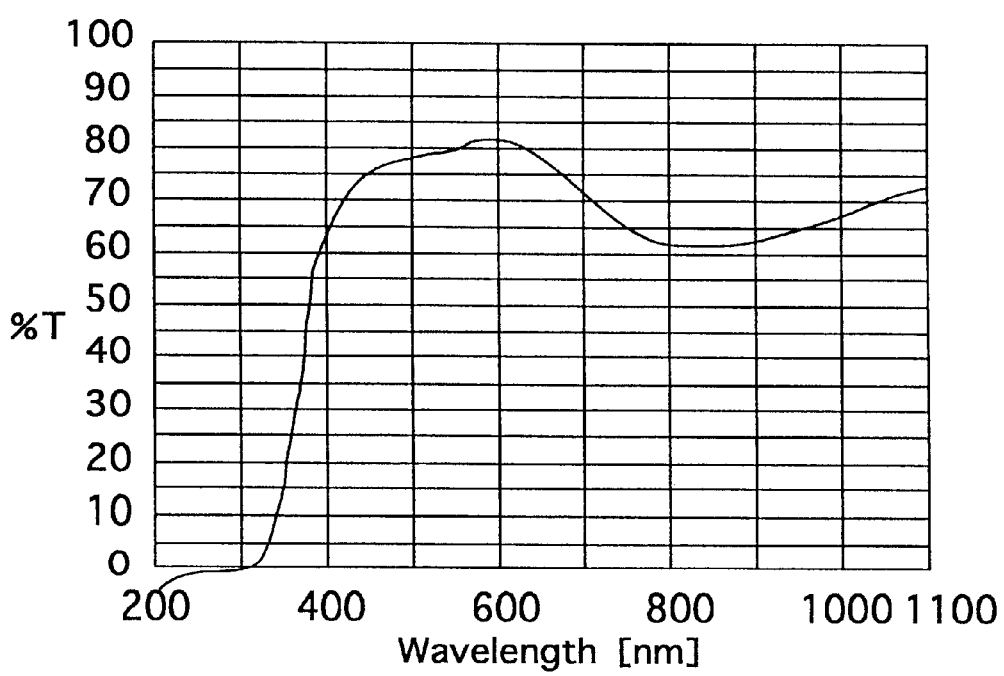
FIG. 10 is a chart showing the transmittance of the acrylic film obtained in Example 5.

To 100 parts by weight of a 2-hydroxyethyl acrylate (a product of Tokyo Kasei Kogyo Co., Ltd.) solution containing 0.1 mg/ml of the copper salt of 2-sulfoethyl methacrylate obtained in Example 3 were added 50 parts by weight of a polyester acrylate, M 6200 (a product of Toagosei Co., Ltd.) and 1.5 parts by weight of a 2-hydroxyethyl acrylate (a product of Tokyo Kasei Kogyo Co., Ltd.) solution containing 0.1 mg/ml of Irgacure 184 (a product of Ciba Specialty Chemicals K.K.). The resulting solution was coated on a PET film, followed by UV application for 3 minutes, to obtain a nearly colorless near infrared absorption film. The film was measured for transmittance for 200 to 1,100 nm to obtain a chart shown in FIG. 10. As is clear from the chart of FIG. 10, the film has a high transmittance for a visible light and an absorptivity for a near infrared light.

COMPARATIVE EXAMPLE 4

To 100 parts by weight of a saturated 2-hydroxyethyl acrylate (a product of Tokyo Kasei Kogyo Co., Ltd.) solution containing about 0.038 mg/ml of copper acetate monohydrate were added 50 parts by weight of a polyester acrylate, M 6200 (a product of Tokyo Kasei Kogyo Co., Ltd.) and 1.5 parts by weight of a 2-hydroxyethyl acrylate (a product of Tokyo Kasei Kogyo Co., Ltd.) solution containing 0.1 mg/ml of Irgacure 184 (a product of Ciba Specialty Chemicals K.K.). The resulting solution was coated on a PET film, followed by UV application for 3 minutes, to obtain a blue near infrared absorption film. The film was measured for transmittance for 200 to 1,100 nm to obtain a chart shown in FIG. 11.

Figure 11:
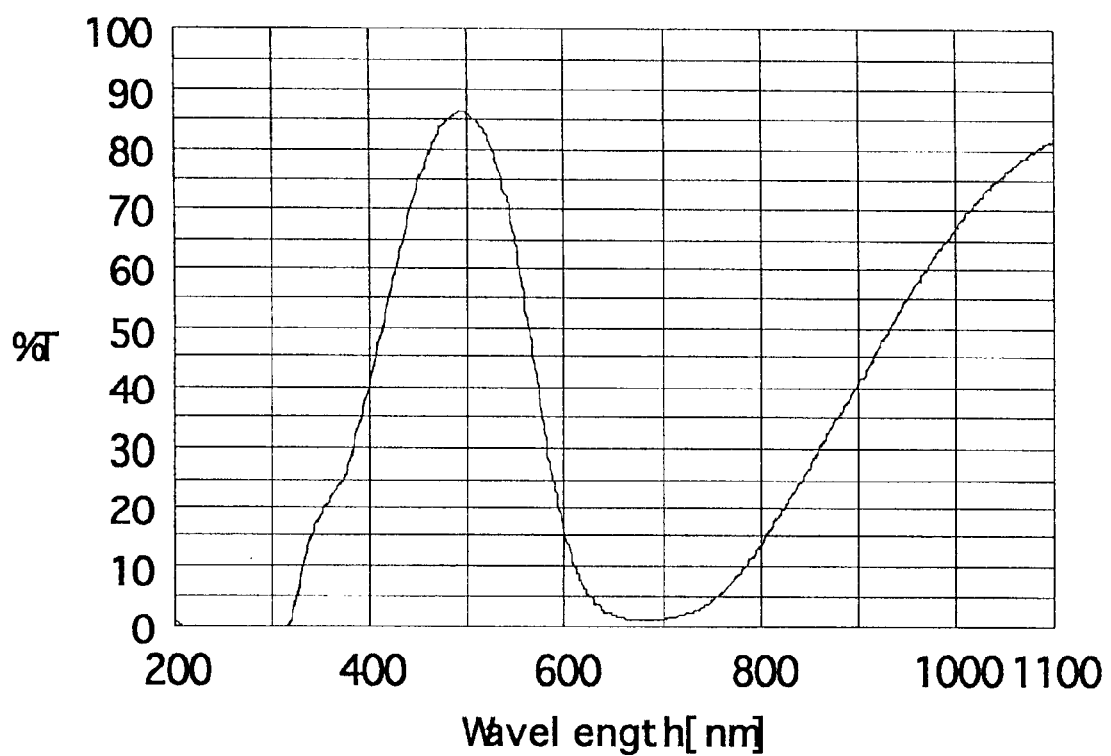
FIG. 11 is a chart showing the transmittance of the acrylic film obtained in Comparative Example 4.

As is clear from the chart of FIG. 11, since a molecular weight of copper acetate monohydrate is smaller than that of copper salt of 3-sulfopropyl methacrylate, and accordingly, same weight of copper acetate monohydrate contains large mole number as conpared with copper salt of 3-sulfopropyl methacrylate, the film shows high absorption but the maximum absorption wavelength is 700 nm or smaller (that is, the absorption for visible light region is high and the transmittance for visible light region is low); moreover, the absorption for near infrared region is not high.

As is clear from the foregoing Examples, it is possible to produce, from the near infrared absorption composition of the present invention, a transparent near infrared absorption filter which has a high transmittance for a visible light and a high absorptivity for a near infrared region and which can be used as a plasma display panel surface plate or a heat ray absorption plate or film, in a simple constitution and a simple method without giving any adverse effect on environment.

The sulfonic acid group-containing (meth)acrylic compound used in the present composition can be easily obtained by subjecting a sulfonic acid salt of acrylic acid (which is an industrial material) to ion exchange for desalting, and the other (meth)acrylic compound also used in the present composition can also be obtained easily. Therefore, the present invention can be carried out easily.

What is claimed is:

1. A near infrared absorption acrylic composition containing a sulfonic acid group-containing (meth)acrylic compound represented by the following general formula (1):

$$R(CH_2)_nSO_3H \tag{1}$$

wherein R is $CH_2$=CHCOO— or $CH_2$=C($CH_3$)COO—, and n is an integer of 1 to 8, other (meth)acrylic compound and $Cu^{2+}$.

2. A near infrared absorption acrylic composition according to claim 1, wherein the $Cu^{2+}$ is added as a carboxylic acid salt.

3. A near infrared absorption resin composition which is a polymer solution containing a salt of sulfonic acid group-containing (meth)acrylic compound represented by the following general formula (2):

$$[R(CH_2)_nSO_3^-]_2Cu^{2+} \tag{2}$$

wherein R is $CH_2$=CHCOO— or $CH_2$=C($CH_3$)COO—, and n is an integer of 1 to 8, said polymer solution being selected from the group consisting of a polyvinyl alcohol solution and a polyvinyl butyral solution.

4. A near infrared absorption filter obtained from the near infrared absorption composition set forth in claim 3.

5. A near infrared absorption acrylic resin plate produced, by thermal polymerization, from the near infrared absorption acrylic composition set forth in claim 1.

6. A near infrared absorption filter comprising the near infrared absorption acrylic resin plate set forth in claim 5.

7. A near infrared absorption acrylic resin film produced, by UV polymerization, from the near infrared absorption acrylic composition set forth in claim 1.

8. A near infrared absorption filter comprising the near infrared absorption acrylic resin film set forth in claim 7.

9. A near infrared absorption acrylic resin plate produced, by thermal polymerization, from the near infrared absorption acrylic composition set forth in claim 2.

10. A near infrared absorption filter comprising the near infrared absorption acrylic resin plate set forth in claim 9.

11. A near infrared absorption acrylic resin film produced, by UV polymerization, from the near infrared absorption acrylic composition set forth in claim 2.

12. A near infrared absorption filter comprising the near infrared absorption acrylic resin film set forth in claim 11.

* * * * *